United States Patent
Robin et al.

(10) Patent No.: US 8,342,413 B2
(45) Date of Patent: Jan. 1, 2013

(54) METHOD FOR ENHANCING DOCUMENT SECURITY AND DEVICE FOR IMPLEMENTING SAID METHOD

(75) Inventors: Philippe Robin, Bourg la Reine (FR); Pierre Ly, Le Plessis Robinson (FR); Yves Thebault, Verrieres-le-Buisson (FR); Henri Gargallo, Courbevoie (FR); Michel Cormier, Cergy (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/092,461

(22) PCT Filed: Oct. 30, 2006

(86) PCT No.: PCT/EP2006/067944
§ 371 (c)(1),
(2), (4) Date: Aug. 14, 2008

(87) PCT Pub. No.: WO2007/051782
PCT Pub. Date: May 10, 2007

(65) Prior Publication Data
US 2009/0166409 A1    Jul. 2, 2009

(30) Foreign Application Priority Data
Nov. 4, 2005   (FR) ..................................... 05 11257

(51) Int. Cl.
*G06K 19/02*    (2006.01)
(52) U.S. Cl. ......... 235/488; 235/487; 235/492; 235/493
(58) Field of Classification Search .................. 235/380, 235/487, 488, 492, 375, 493
See application file for complete search history.

(56) References Cited

U.S. PATENT DOCUMENTS

| | | | |
|---|---|---|---|
| 5,380,695 A | 1/1995 | Chiang et al. | |
| 5,816,619 A | 10/1998 | Schaede | |
| 6,162,160 A | 12/2000 | Ohshima et al. | |
| 6,506,478 B1 * | 1/2003 | Schulz | 428/32.25 |
| 2004/0066441 A1 | 4/2004 | Jones et al. | |
| 2004/0144472 A1 * | 7/2004 | Cowie | 156/64 |
| 2004/0146751 A1 * | 7/2004 | Cueli | 428/694 SL |
| 2005/0040243 A1 * | 2/2005 | Bi et al. | 235/492 |
| 2005/0067497 A1 * | 3/2005 | Jones et al. | 235/492 |
| 2005/0205663 A1 * | 9/2005 | Algiene | 235/380 |
| 2005/0242194 A1 * | 11/2005 | Jones et al. | 235/487 |

FOREIGN PATENT DOCUMENTS

| | | |
|---|---|---|
| EP | 1 364 809 A1 | 11/2003 |
| FR | 2 278 654 A1 | 3/1999 |
| WO | 90/05640 A1 | 5/1990 |
| WO | 2004101290 A2 | 11/2004 |

* cited by examiner

*Primary Examiner* — Michael G Lee
*Assistant Examiner* — Tabitha Chedekel
(74) *Attorney, Agent, or Firm* — Lowe, Hauptman, Ham & Berner, LLP

(57) ABSTRACT

The present invention relates to a method of enhancing document security for documents of the type each comprising a print medium on which is printed personalizing information, this printed medium being laminated between two laminates that are at least partially transparent, this method rendering any forging of these documents by ungluing the laminates ineffective, and it is characterized in that at least one additional phantom personalizing image is printed on at least one of the laminates.

18 Claims, 1 Drawing Sheet

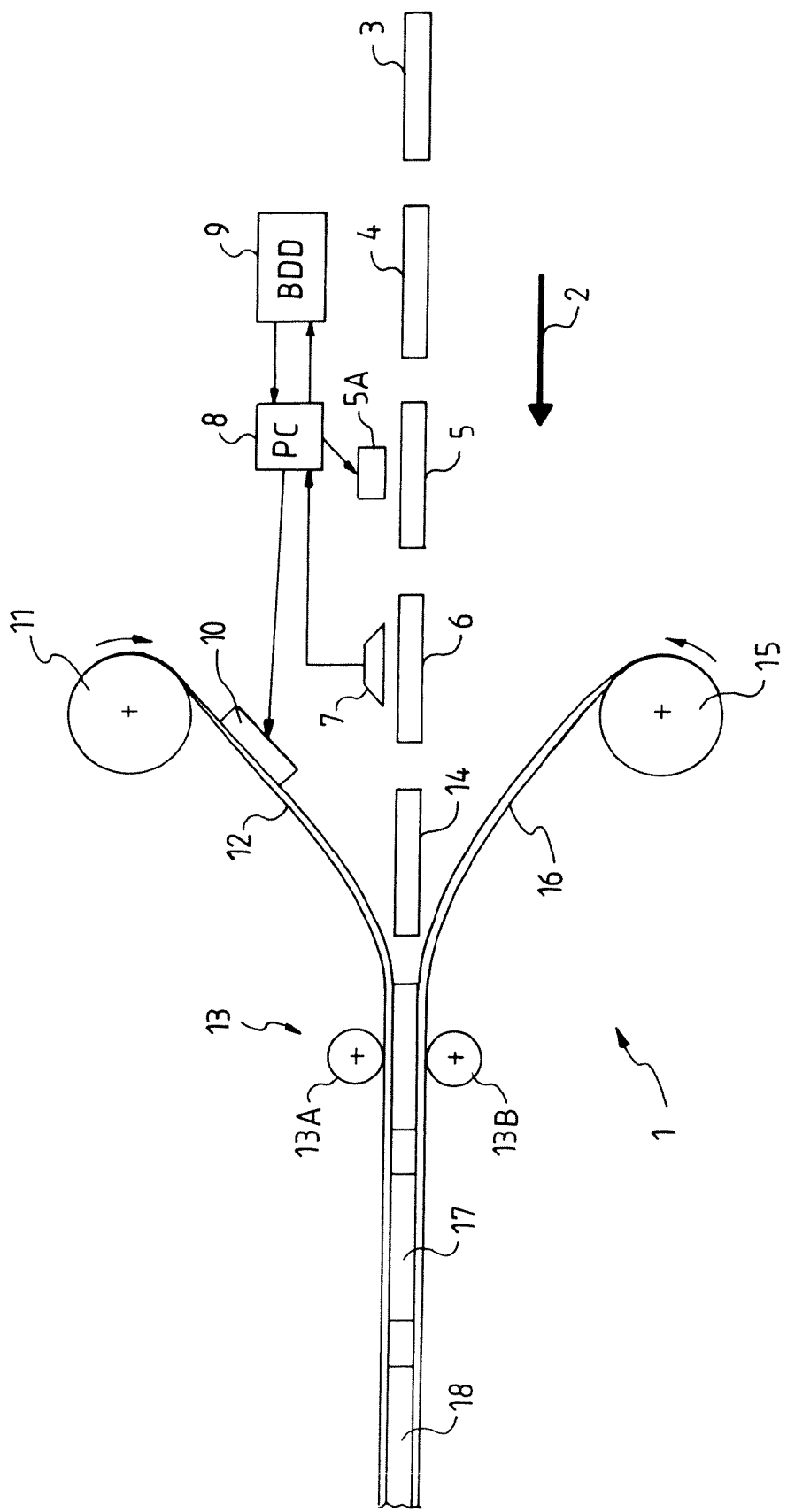

METHOD FOR ENHANCING DOCUMENT SECURITY AND DEVICE FOR IMPLEMENTING SAID METHOD

CROSS-REFERENCE TO RELATED APPLICATIONS

The present Application is based on International Application No. PCT/EP2006/067944, filed on Oct. 30, 2006, which in turn corresponds to French Application No. 05 11257 filed on Nov. 4, 2005, and priority is hereby claimed under 35 USC §119 based on these applications. Each of these applications are hereby incorporated by reference in their entirety into the present application.

FIELD OF THE INVENTION

The present invention relates to a method of enhancing document security, and a device for implementing this method and documents obtained by the implementation of this method.

BACKGROUND OF THE INVENTION

Many identity documents are made from xerographic printing on sheets of different formats. After these sheets have been cut, each cut part (called "coupon") is laminated between two sheets of transparent plastic.

There now follows a brief description, by way of example, of the method of producing an identity card, the print medium of which is Teslin™ (a very highly silica-filled polyethylene, printed easily by offset, inkjet or laser and toner printing). The Teslin sheets are first of all offset printed in order to produce the card background which comprises conventional security features, such as fine ornamental lines, iridescence (patterns with a color that changes continually from one color to another from one end of the card to the other). These sheets are then normally cut to A4 format. Eight cards can be positioned on such a format. Using a xerographic printer, the various cards of the A4 sheets are personalized with a photograph on the front and corresponding legal status information on the front and the back. The duly personalized sheets are then cut to a basic format (called coupon) slightly larger than that of the final card. Finally, the coupons are laminated between two polyester/polyethylene laminates, then cut to the standard identity card format called "ID1". Additional security elements can be added, for example prints visible in ultraviolet light or holograms deposited on the internal face of one of the laminates. Laminates on reels including such security elements are commercially available.

This known method of producing identity cards offers a good level of security, but it is not proof against a sophisticated form of forgery consisting in heating up the cards, ungluing the protective laminates from these cards, modifying the data written on these cards and regluing the laminates onto the forged cards.

SUMMARY OF THE INVENTION

The subject of the present invention is a method of enhancing document security of the abovementioned type making any forging of these documents by ungluing the laminates ineffective. Also subjects of the invention are a machine for implementing this method and secure documents obtained using this machine.

The method according to the invention is a method of enhancing document security, each document comprising a print medium on which is printed personalized information, this printed medium being laminated between two laminates that are at least partially transparent, and it is characterized in that at least one additional personalizing element consistent with said personalizing information is printed on at least one of the laminates. Preferably, this additional personalizing element is one of the following elements: an ordinary image, an image that is fluorescent under ultraviolet lighting (called "phantom image"), a text, a graphic, a holographic pattern personalized at the time of the personalizing print or even an encrypted element.

According to another characteristic of the invention, the print medium has dimensions greater than those of the final document and thus includes at least one free margin, and a code identifying the corresponding document is printed in this margin, and this code is then read to enable the corresponding personalizing information to be printed on the medium and a personalized additional security phantom image to be printed on at least one of the laminates.

The machine for producing secure documents according to the invention is a machine comprising an unstacker for storing coupons or sheets of print medium printed and partially personalized and including an identification code specific to each coupon, a station for reading said code, a station for processing the code linked to an additional personalization database, a laminating station, reels of laminate, a cutting station and a finished document stacker/receiver, and it is characterized in that the code processing station is linked to a printer for printing a phantom image on one of the laminates.

According to a characteristic of the invention, said printer printing a phantom image is a printer with pigmented ribbon that is fluorescent under ultraviolet lighting.

According to another characteristic of the invention, the inventive machine comprises means of synchronization between the information printed on one of the laminates and the corresponding coupon.

The secure document according to the invention is of the type comprising an information medium on each side of which is glued, preferably by hot gluing, a laminate, and comprising partial personalizing information on the information medium, and it is characterized in that at least one of the two laminates includes personalized information.

According to a characteristic of the invention, the personalized information is at least one phantom image fluorescent under ultraviolet lighting.

According to another characteristic of the invention, the phantom image is partially transferred to the information medium.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein:

the single FIGURE is a simplified diagram of an exemplary embodiment of a machine implementing the inventive method.

DETAILED DESCRIPTION OF THE INVENTION

The invention is described below with reference to the production of identity cards in the standard ID1 format, but obviously it is not limited solely to this application, and it can be implemented for the production of any documents needing to be secured, whatever their dimensions. Similarly, the invention, which is described hereinbelow with reference to a personalizing element in the form of a phantom image, also extends to the cases where this personalizing element is of another type, for example a non-phantom image, a text, a graphic, and so on.

FIG. 1 diagrammatically represents an exemplary embodiment of a machine for producing secure documents 1 according to the invention. Most of the elements that make up this machine are those of similar prior art machines, except for those relating to the printing of phantom images and to the processing of these images. The machine 1 comprises a conveyor belt, not represented (or several, if necessary) running in the direction of the arrow 2 (from right to left, in the drawing) and responsible for automatically transporting between the various stations described hereinbelow the various components of identity cards as they are created. As a variant of the invention, a part of the transport operations between the various stations, or all of them, can be performed manually.

The first station (in chronological order of the production of the secure documents) of the machine 1 is a station 3 for preprinting a print medium (in Teslin™, for example) and cutting this medium into sheets in A4 format for example. Such a format can contain eight cards, separated from each other by a margin area, which will subsequently be eliminated, after the cards have been laminated. The preprinting consists in printing, on the Teslin sheets, card backgrounds of the type described hereinabove in the introduction.

The station 3 is followed by an "unstacker" station 4 storing the pre-personalized and cut sheets. At the station 5, which is the personalizing station, the usual different items of information each relating to the eight future identity cards are printed on each of the eight locations of each sheet, for example using a xerographic printer. This information is generally: the photograph of the holder, holder's legal status data, the holder's signature and so on. Furthermore, according to the invention, a "1D" barcode (extending in a single direction) is printed to the side of each position (in the margin mentioned above). This barcode will subsequently be used to identify each future coupon to print personalizing and corresponding security information thereon. At this station 5, the A4 sheets are cut to the individual format, called "coupon", which is slightly bigger than the final identity card. At the next station, station 6, the coupons are conveyed individually and a barcode reader 7 reads the ID code printed on each of them. The information corresponding to this barcode is sent to a machine management computer 8, for example a PC. This computer 8 is linked to a database 9 containing all the information needed to personalize the identity cards. The computer 8 is also linked to a printer 5A of the station 5 which prints said personalizing information on each sheet.

The inventive security method consists in choosing certain of these items of personalizing information from the database 9 (for example the photograph of the future holder of the identity card, but with a lower resolution than that of the photograph printed directly on the Teslin medium) and in printing them as a phantom image on one of the laminates in the manner explained hereinbelow. Advantageously, this phantom image has dimensions slightly smaller than those of the final identity card, in order to cover the greatest possible surface area thereof. To this end, the computer 8 is linked to a thermal printer 10. This printer 10 uses a pigmented ribbon that is fluorescent under ultraviolet lighting. A first laminate, applied to the front of the coupons, comes from a first pay-out device 11 positioned above the conveyor and from which the strip of laminate 12 is directed to a laminating station 13. The station 13 is provided with two heating laminating rollers 13A, 13B. This strip 12 passes in front of the printer 10 positioned on the internal side of the strip 12 (the side that will be applied against the front of the coupons). The station 13 is located downstream of the station 6, and it receives the coupons 14 therefrom after they have been read at the station 6. A second pay-out device 15, located under the conveyor, contains a strip of laminate 16 which is applied against the back of the coupons at the station 13. After passing between the rollers 13A and 13B, the laminated coupons 17 are conveyed to a cutting station 18. At this station 18, the laminated coupons are cut to the standard format, called ID1, to obtain the final personalized and secure identity cards. This cutting operation eliminates in particular said margins containing the ID barcode.

Thus, according to the inventive method, hot laminating is advantageously performed in the following conditions:
    roller heating temperature range: 100° C. to 130° C.
    Heating time during laminating: 3 to 5 seconds
    However, the laminate is preheated for approximately 3 seconds between plates having a temperature of 185° C.
    In such conditions, the phantom image is partially transferred to the Teslin, which results in an irreversible modification of the phantom image observed after ungluing the laminate, forging of the document and regluing of the latter. Furthermore, if a forger were to change the photograph printed on the Teslin, the phantom image (the corresponding new photograph, with lower resolution) that he or she would print on the laminate would be disturbed by the original phantom image part which is transferred to the Teslin in the original laminating operation and which is practically impossible to remove.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of preparing an identity document, the identity document having a print medium on which is printed personal information, the method comprising:
    printing at least one additional personalized element consistent with said personal information on at least one laminate, at least a portion of the at least one laminate is transparent;
    applying the at least one laminate onto a first side of the print medium; and partially transferring the at least one additional personalized element onto the first side of the print medium thereby irreversibly modifying the additional personalized element wherein the print medium comprises a region for forming a final document and a free margin corresponding to the region for forming the final document, the method further comprises:

printing a code in the free margin; and reading the code to identify, from a database, the personal information to be printed on the region for forming the final document and the at least one additional personalized element to be printed on the at least one laminate.

2. The method as claimed in claim 1, wherein the personalized element is an encrypted element.

3. The method as claimed in claim 1, wherein the personalized element is an additional security image.

4. The method as claimed in claim 3, wherein the image is an image that is fluorescent under ultraviolet lighting.

5. The method as claimed in claim 1, wherein the personalized element is a text.

6. The method as claimed in claim 1, wherein the personalized element is a graphic.

7. The method as claimed in claim 1, wherein the personalized element is a holographic pattern personalized at the time of the printing.

8. The method as claimed in claim 1, further comprising applying another laminate onto a second side of the print medium.

9. The method as claimed in claim 1, wherein the applying the at least one laminate and the partially transferring the additional personalizing element are performed by applying the at least one laminate using a heating laminating roller.

10. The method as claimed in claim 9, further comprising heating the heating laminating roller to the temperature ranging from 100° C. to 130° C.

11. The method as claimed in claim 9, further comprising preheating the at least one laminate before the applying the at least one laminate.

12. A machine for producing secure documents, comprising:

a computer configured to manage the machine;

a database coupled to the computer and configured to store personal information;

a code reader coupled to the computer and configured to read an identification code from a free margin of a print medium, the print medium having the personal information and the identification code specific to the print medium printed thereon according to the identification code;

a printing station coupled to the computer and configured to print an additional personalized element on a laminate; and a laminating station comprising at least a heating laminating roller and configured to apply the laminate onto the print medium and partially transferring the additional personalized element onto the print medium thereby irreversibly modifying the additional personalized element.

13. The machine as claimed in claim 12, wherein said printing station comprises a printer capable of printing a pigmented ribbon that is fluorescent under ultraviolet lighting.

14. The machine as claimed in claim 12, wherein the additional personalized element is consistent with the personal information.

15. The machine as claimed in claim 12, wherein the laminating station further comprises heating plates configured to preheat the laminate positioned therebetween.

16. A secure document comprising:

an information medium, a side of the information medium having personal information printed thereon, and the information medium further having a free margin where an identification code is formed thereon, the identification code being arranged for identifying the personal information from a database;

a laminate positioned on the side; and an additional personalized element being sandwiched between the laminate and the side, the additional personalized information element being arranged to be partially transferred from the laminate onto the information medium thereby the additional personalized information element being irreversibly modified.

17. The document as claimed in claim 16, wherein the additional personalized element comprises at least one of the following elements: an image, a phantom image fluorescent under ultraviolet lighting, a text, a graphic, a element is holographic pattern, or an encrypted element.

18. The document as claimed in claim 16, wherein the additional personalized element is consistent with the personal information.

* * * * *